United States Patent [19]

Kitchen et al.

[11] 4,307,945
[45] Dec. 29, 1981

[54] PROGRESSIVELY VARYING FOCAL POWER OPTHALMIC LENS

[75] Inventors: George A. Kitchen, Plantation; Wiktor J. Rupp, Hollywood, both of Fla.

[73] Assignee: Itek Corporation, Lexington, Mass.

[21] Appl. No.: 137,102

[22] Filed: Apr. 4, 1980

Related U.S. Application Data

[63] Continuation-in-part of Ser. No. 121,774, Feb. 14, 1980, abandoned.

[51] Int. Cl.³ ............................................. G02C 7/06
[52] U.S. Cl. .................................................. 351/169
[58] Field of Search .............................. 351/168, 169

[56] References Cited

U.S. PATENT DOCUMENTS

| | | | |
|---|---|---|---|
| 3,687,528 | 8/1972 | Maitenaz | 351/169 |
| 3,711,191 | 1/1973 | Tagnon | 351/169 |
| 3,785,724 | 1/1974 | Cretin-Maitenaz | 351/169 |
| 3,910,691 | 10/1975 | Maitenaz | 351/169 |
| 4,055,379 | 10/1977 | Winthrop | 351/169 X |
| 4,056,311 | 11/1977 | Winthrop | 351/169 |
| 4,062,629 | 12/1977 | Winthrop | 351/169 |
| 4,240,719 | 12/1980 | Guilino et al. | 351/169 |
| 4,253,747 | 3/1981 | Maitenaz | 351/169 |

*Primary Examiner*—John K. Corbin
*Assistant Examiner*—Scott J. Sugarman
*Attorney, Agent, or Firm*—Homer O. Blair; Robert L. Nathans; Gerald H. Glanzman

[57] ABSTRACT

A progressively variable focal power ophthalmic lens. The lens has a unique geometry which allows the correction of distortion of horizontal and vertical lines to be retained below detectable levels in the temporal peripheral zone of the lens after the lens is rotated to accommodate the left or right eye. In addition, the geometry further allows the minimization of the astigmatic aberration in the area of the peripheral zone adjacent to the distance portion and the elimination of the astigmatic aberration in the lower part of the temporal peripheral zone.

5 Claims, 10 Drawing Figures

PROGRESSIVELY VARYING FOCAL POWER OPTHALMIC LENS

This is a continuation-in-part application of Ser. No. 121,774 filed on Feb. 14, 1980 now abandoned.

TECHNICAL FIELD

The present invention relates generally to the field of ophthalmic lenses, and, more particularly, to ophthalmic lenses having a progressively varying focal power.

BACKGROUND ART

Presbyopia is a term used to refer to the condition of reduced or defective elasticity of the crystalline lens of the eye. It is an ailment that eventually affects most people, usually around middle age, and it is characterized by the inability of the eye to attain a sharp focus for near vision.

Traditionally, the treatment for presbyopia has been to prescribe corrective ophthalmic lenses having two or more spherical surfaces or segments of different refractive power. In particular, these lenses, known as multifocal lenses, are designed such that the power of one segment will permit proper focusing on nearby objects while the other segment or segments will correct the vision for viewing objects at greater distances. Typically, a person suffering from presbyopia will initially wear lenses having two segments known as bifocals, and, as the eye further deteriorates, may later require lenses having three segments, called trifocals, to assist in focusing on objects at intermediate distances.

Multifocal lenses have been in use for a great many years and are generally quite acceptable insofar as their ability to provide improved vision. They do, however, suffer from several inadequacies. For one thing, conventional multifocal lenses have a sharp dividing line or discontinuity between the various segments of the lens, and, when the line of sight scans across this dividing line, a jump usually occurs in the image perceived by the wearer. For many wearers, it is difficult to adjust to this sensation.

Also, many patients, particularly those having severely reduced powers of accommodation (the ability of the eye to automatically adjust for viewing objects at different distances is referred to as "accommodation"), are unable to clearly focus on objects that lie between those distances for which the various segments of the lens are designed to focus.

Finally, many people having reduced accommodation powers are hesitant to wear multifocal lenses because of their belief that it detracts from their appearance and suggests to others that they are growing old. Such people, although they may require corrective spectacles, will not wear them, at least not regularly, and thus are not only sacrificing good vision but are also creating a safety problem as, for example, driving without proper glasses.

Recognizing the inadequacies of conventional multifocal lenses, a new type of lens has been introduced into the marketplace in recent years. These lenses are generally known as progressively variable focal power lenses or, more simply, as progressive power lenses, and they are designed to provide multifocal lens characteristics without any sharp dividing line or discontinuity between the various portions of the lens. Specifically, such lenses are characterized by having a progressive power portion positioned between and merging into the distance and reading portions of the lens. Furthermore, the progressive portion is designed to have a continuously varying focal power beginning with a focal power equal to that of the distance portion where it merges with and into the distance portion and ending with a focal power equal to that of the reading portion where it merges into the reading portion of the lens.

These three portions, the distance, reading and progressive power portions, constitute the functional zone of the lens, and this zone provides corrective optical powers defined by prescription. The remaining area of the lens constitutes the peripheral zone which is usually strongly aberrated and does not provide proper corrective power for the wearer.

The basic patent for this type of lens was issued in 1915 (U.S. Pat. No. 1,143,316) and a more refined version was issued in 1924 (U.S. Pat. No. 1,518,405). Both patents dealt mainly with the functional zone of the lens. The numerous patents issued subsequently provided different formulations for the peripheral zone, aiming at reducing the aberrations or dealing with manufacturing methods or both. The introduction of numerically controlled surface generating machines in the last decade removed many limitations that were imposed by manufacturing techniques; and, consequently, more recent patent focused on the minimization of aberrations in the peripheral zone.

Two aberrations in that zone which have a major effect on the wearer's comfort are astigmatism and distortion of horizontal and vertical lines. The physical and mathematical properties of these two aberrations are well understood by those skilled in this field, and it is recognized that due to physical requirements which have to be fulfilled in the functional zone, these aberrations cannot be completely eliminated. This limits the design objective to the development of a surface geometry having a particular distribution of aberrations in the peripheral zone so as to provide the best possible comfort to the wearer.

Particularly disturbing is the distortion of horizontal and vertical lines in the temporal peripheral zone. Also, the unavoidable astigmatic aberration is particularly offending in the zone adjacent the distance portion as it affects the near peripheral vision during distance viewing. Another undesirable place for this aberration is the lowest portion of the peripheral zone because it tends to distort true ground level perception. Typically, the more recent U.S. patents, such as U.S. Pat. Nos. 3,687,528; 3,711,191; 3,910,691; 4,055,379 and 4,062,629 are all aimed at providing the best solution for the above described conditions.

DISCLOSURE OF THE INVENTION

The present invention addresses the same design objective as above, i.e., to provide the best possible comfort to the wearer. In particular, the present invention provides a novel mathematical model for the geometry of the entire lens surface which permits a reduction of the distortion of horizontal and vertical lines in the temporal peripheral zone below detectable levels which minimizes the astigmatic aberration in the area adjacent to the distance portion and which eliminates the astigmatic aberration in the lower part of the temporal peripheral zone.

Furthermore, the present invention provides a unique geometry which allows these characteristics to be retained after rotating the lens to accommodate for the right or left eye. In particular, since the lenses have to be used for both distance and near vision, the optical centers for both the distance portion and reading portion cannot be placed on the same vertical line. Instead, the optical center for the reading portion has to be closer to the nose for both right and left lens due to the convergence of the eyeballs when viewing near objects. (See FIG. 4)

Basically, this requires two different lens designs for the right and left eye, and, in fact, certain prior art embodiments do provide a different lens design for each eye. An economical and more desirable solution to this problem is to provide one common design for the right and left eye and then displace the reading segment toward the nose by rotating the lens around the lens center, and other prior art lenses on the market are designed this way. This approach, however, creates other design difficulties. Specifically, if the lens is corrected for distortion of horizontal and vertical lines in the peripheral zone for one central orientation, it loses the correction after it is rotated to accommodate the left or right eye. With the present invention, the correction is not lost after rotation.

Other specific features and advantages of the present invention will be set forth hereinafter in conjunction with the detailed description of the best mode for carrying out the invention.

BRIEF DESCRIPTION OF THE DRAWINGS

FIG. 2 schematically illustrates a progressive lens surface according to the present invention positioned within a coordinate system used to permit a mathematical description of the surface of the lens. In particular, FIG. 2a illustrates a front view of the lens surface, while FIGS. 2b and 2c illustrate cross-sectional views of the lens surface looking in the directions of arrows 2—2 and 3—3, respectively in FIG. 2a.

FIG. 3a is a front view of the lens surface while FIGS. 3b and 3c are cross-sectional views looking in the direction of arrows 4—4 and 5—5, respectively of FIG. 3a.

BEST MODE FOR CARRYING OUT THE INVENTION

Figure 1:
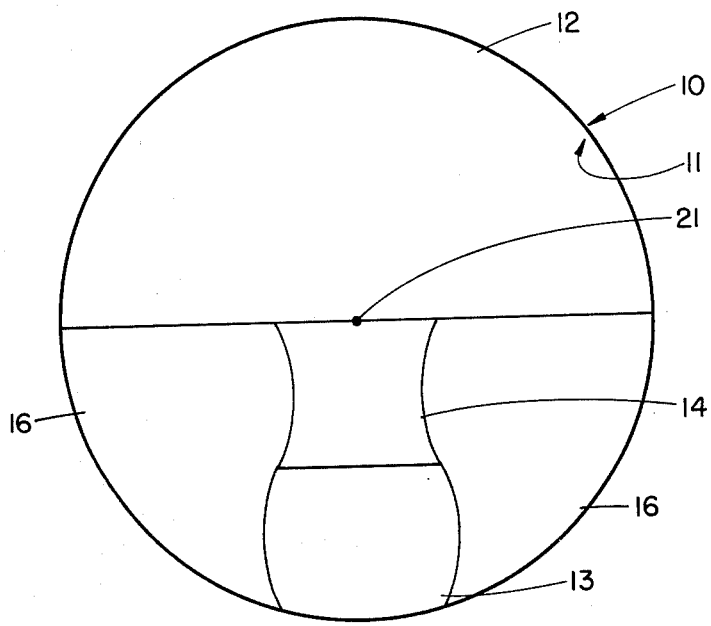
FIG. 1 schematically illustrates a progressive power lens in accordance with the present invention.

FIG. 1 schematically illustrates an opthalmic progressive power lens 10 in accordance with a presently preferred embodiment of the invention, and, in particular, the front convex surface 11 of such a lens. Lens surface 11 may be considered as being divided into at least four surface portions or zones; distance portion 12, reading portion 13, progressive corridor 14 and peripheral zones 16.

Distance portion 12 occupies essentially the top half of the lens and is preferably of a spherical curvature having constant dioptric power throughout, and is used for viewing objects located at a distance. The reading portion 13 is located near the bottom of the lens, and is preferably also of constant power and of spherical curvature for use in viewing objects at normal reading distances.

Progressive corridor 14 is located between and optically connects the distance and reading portions of the lens surface. As is known in the art, and as will be discussed more fully hereinafter, progressive portion 14 comprises a corridor which extends from the distance to the reading portion and which gradually and continuously changes in power from a power equal to that of the distance portion where it joins the distance portion to a power equal to that of the reading portion where it joins the reading portion. As the eye scans this corridor from the top to the bottom, clear vision will be obtainable of objects placed at any distance between infinity and the reading distance.

From a theoretical point of view, it is desirable that the progressive corridor would be free of astigmatic power difference along its entire length. However, it has to be recognized that from a physiological point of view, the eye can easily tolerate some astigmatic power difference, especially at the beginning (top) of the corridor. This part of the corridor is very seldom used for visual tasks, because the residual accommodative power allows the wearer to use the distance portion for visual tasks in this power range. In our invention, we recognize that the introduction of some tolerable astigmatism into the progressive corridor provides significant overall functional improvement of the lens. In particular, the curvature of essentially any vertical element of the corridor is always made flatter, i.e. of weaker dioptric power, than the curvature of the corresponding horizontal cross-sections at the vertical element. Typically, the power difference between vertical and horizontal curvature elements along the progressive corridor is about 20% of the add power at the beginning of the corridor and tapers off to zero at the end of the corridor. Because the vertical cross-section of the progressive corridor designed according to this invention is flatter than in the case of a conventional design, the entire reading section is being brought forward closer to the sphere defining the distance portion. Consequently, the peripheral portion, which provides the connection between the distance portion and the reading portion will be less distorted, resulting in less astigmatic power difference. Another additional advantage of this approach is better thickness uniformity of the lens blank which results in a thinner lens for positive distance power.

As indicated previously, the distance portion, reading portion and progressive corridor constitute the functional zone of the lens which provides corrective optical powers defined by prescription. The remainder of the lens identified by reference number 16 constitutes the peripheral zones of the lens surface. The function of these areas is simply to fill out the remaining area of the lens to provide one continuous optical surface. As will become apparent hereinafter, it is in these zones that aberrations are, of necessity, present, and where the present invention is primarily directed in order to provide a lens of optimal characteristics throughout.

It should be clearly understood at this point that the divisions illustrated in FIG. 1 between the various portions of the lens surface are provided for ease in explanation only. In actuality, there are no lines or discontinuities present either physical or optical. Instead, each portion of the lens surface gradually blends into and merges with adjacent portions. As the eye scans across the lens, for example, from the reading portion to the progressive corridor or from the progressive corridor to a peripheral portion, the wearer will not be able to readily discern any precise area or line where the change from one portion to the other took place.

It should also be understood that the present invention is concerned only with the progressive power surface of the lens which, in the preferred embodiment illustrated in the FIGS., constitutes the convex front surface of the lens 10. The concave back surface of the lens will be provided with a spherical or other surface which is specifically designed to adapt the lens to the particular ophthalmic prescription of the wearer.

As mentioned above, the distance and reading portions of the lens surface 11 will typically be of spherical shape, each having a specific dioptric power. The difference in power between the distance and reading portions could, for example, be from one-half diopter to three diopters or more. The specific powers of these portions of the lens are not pertinent to the present invention, except, of course, that whatever their powers, the progressive corridor must have a power equal to that of the distance portion at its top and a power identical to that of the reading portion at its bottom, and gradually change from one power to the other along its length in a continuous manner.

When a person is wearing progressive power lenses, he will usually view objects through the distance, reading, or progressive corridor portions of the lens. The peripheral zones of the lens will also be looked through on many occasions as well, however, and, therefore, it is important that effort be directed to its design. Since, as was mentioned before, however, it is not possible to design this surface to be totally free of aberrations, the principal goal in designing most progressive power lenses now on the market has been to design these portions of the lens surface so as to minimize errors, or, at least, so that the errors will not cause any discomfort to the wearer.

As a general rule, it has been found to be desirable to eliminate distortion of vertical and horizontal lines in the temporal peripheral zone and to avoid strong astigmatism in the area adjacent to the distance portion and in the lowest portion of the peripheral zone as these are readily noticeable when a scene is viewed through a lens having these characteristics.

Figure 2A:
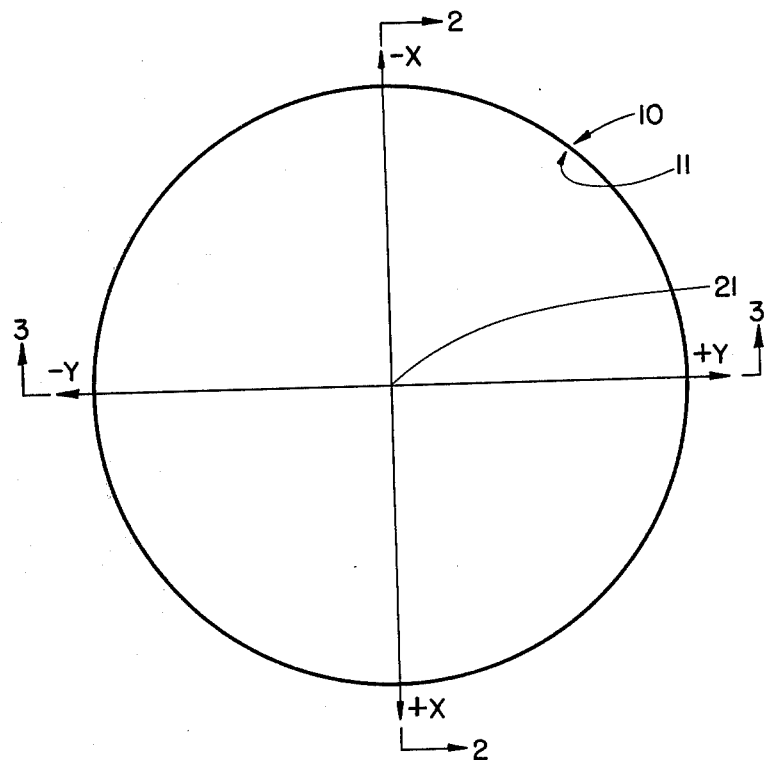
Figure 2B:
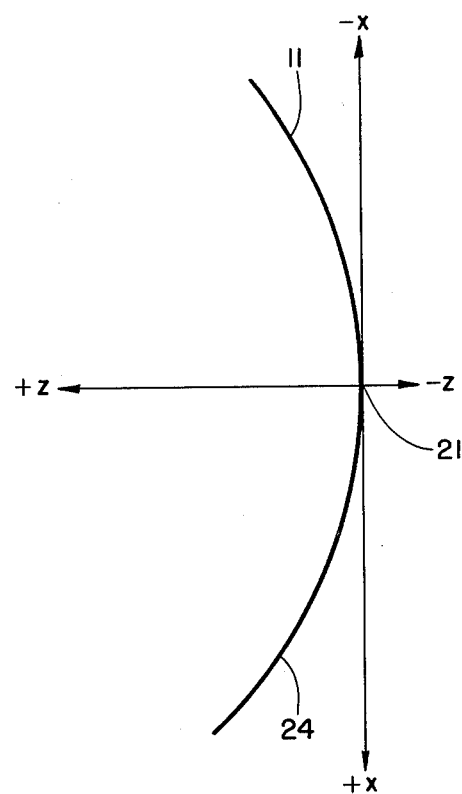
Figure 2C:
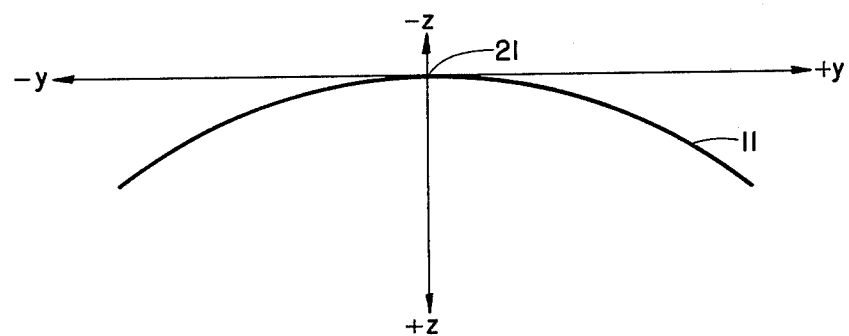

As an aid in explaining the present invention, FIG. 2 schematically illustrates the progressive power lens 10 positioned within a three-dimensional, x, y, z, coordinate system to permit a mathematical description of the lens surface 11. FIG. 2a illustrates a front view of the lens surface, FIG. 2b illustrates a cross-section view of the lens surface looking in the direction of arrows 2—2 in FIG. 2a while FIG. 2c illustrates a cross-sectional view of the lens surface looking in the direction of arrows 3—3 in FIG. 2a. For ease in illustration, only the front progressive surface 11 of the lens is illustrated in the FIGS.

With reference to FIG. 2, the origin of the coordinate system selected is placed at the vertex 21 of the lens surface, which vertex coincides with the beginning of the top of the progressive corridor portion of the lens surface (See also FIG. 1). The x axis of the coordinate system coincides with the projection of the vertical center line 24 of the progressive corridor as is more clearly illustrated in FIG. 2b. This center line is also called the umbilical line and extends along the entire length of the progressive corridor.

Figure 3A:
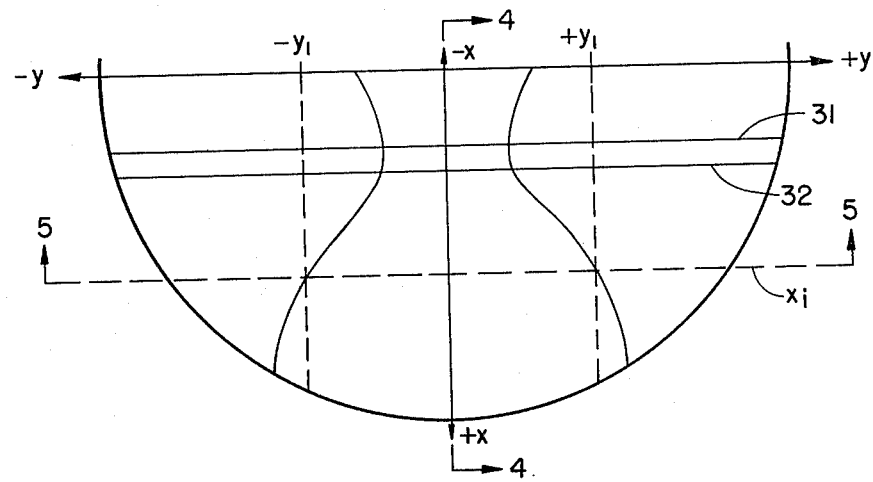
FIGS. 3a, 3b and 3c schematically illustrate the bottom half of the lens surface in the same coordinate system as FIG. 2 in order to assist in understanding the invention.
Figure 3B:
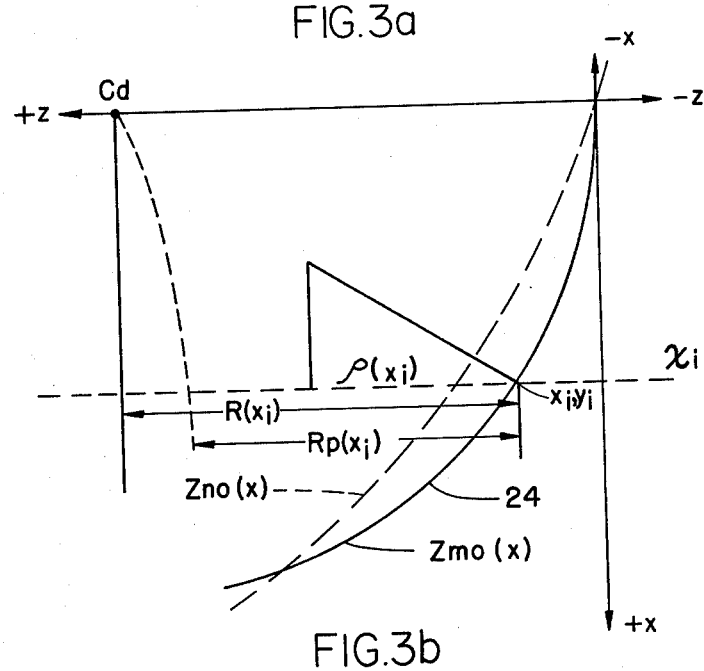
Figure 3C:
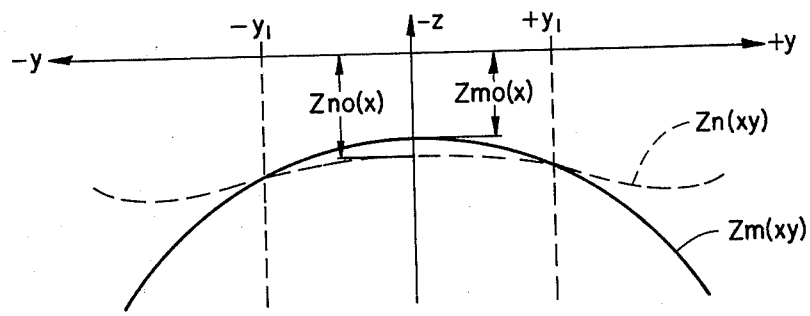

FIGS. 3a, 3b, and 3c schematically illustrate the lens in the same orientations as in FIGS. 2a, 2b, and 2c, respectively, except that for even greater ease in illustration, only the bottom half of the lens surface is shown. Specifically, FIG. 3a illustrates a front view of the lens surface; FIG. 3b a cross-sectional view looking in the direction of arrows 4—4 in FIG. 3a; and FIG. 3c a cross-sectional view looking in the direction of, for example, arrows 5—5 in FIG. 3a. Again, for convenience of illustration, only the progressive surface 11 of the lens is shown.

The top half of the lens constitutes the distance portion 12 (FIG. 1) and is preferably spherical throughout as mentioned previously. In the following description of the lens surface, only the bottom half is discussed and it should be understood that any reference to the lens surface means the bottom half of the lens surface.

The geometry of the lens surface (i.e., the bottom half) is defined in parametric form. Specifically, each cross-section of the surface in planes parallel to the yz plane, (e.g., planes 31 and 32 in FIG. 3a which are perpendicular to the plane of the paper and parallel to the y axis) is defined as a two-dimensional curve by an equation containing parameters of changing values as a function of the coordinate x. Further, these two-dimensional curves are divided into two portions, a central portion located between coordinates $-y_1$ and $+y_1$, (FIGS. 3a or 3c) and a peripheral portion lying outside the $-y_1$ and $+y_1$ boundaries. In other words, $-y_1$ and $+y_1$ define the inner boundaries of the peripheral portions 16 of the lens surface and, although illustrated as straight lines, these $-y_1$ and $+y_1$ boundaries obviously can have any shape to define the inner boundaries of the peripheral portions.

The central portion of the curves (i.e., between $-y_1$ and $+y_1$) are defined by the function $Z_{m(x,y)}$ while the peripheral portion of the curves are defined by the function $Z_{n(x,y)}$. The parametric constants in both functions depend basically on the value of x.

The function $Z_{m(x,y)}$ is defined by the following equation:

$$Z_{m(x,y)} = Z_{mo(x)} + \frac{1}{B_{(x)}} \left( \sqrt{\rho_{(x)}^2 + B_{(x)}y^2} - \rho_{(x)} \right) - \frac{1}{n_{(x)}} C_{(x)} y^{n(x)} \quad (1)$$

The various parameters of this function are, in turn, defined as follows:

$Z_{mo(x)}$ is the function that describes the geometry of the umbilical line 24 (see FIG. 3b). The shape of this curve is governed by the rate of power progression in the progressive corridor and by the value of the power in the reading portion of the lens.

$B_{(x)}$ is the conic constant for the conic component of the function. It assumes such values that transform the conic curve continuously from a circle at the beginning of the progressive corridor (adjacent the distance portion) to a prolate ellipse at the end of the progressive corridor and then back to a circle toward the center of the reading portion. Its function is essentially to improve the surface geometry at the transition area between the progressive corridor and the reading portion.

$\rho_{(x)}$ is the y,z component of local radius of curvature $R_{m(x)}$ of the umbilical line defined by function $Z_{mo(x)}$.

(Again see FIG. 3b which illustrates these functions for a particular cross-sectional curve $x_j$).

The exponential component of function (1) provides a smooth transition to the $Z_{n(x)}$ function.

Parameter $C_{(x)}$ is very small in order to suppress the contribution of this component in the central portion of the curve. Typically, it will change from a value of $10^{-4}$ at $x=0$ to a value of about $10^{-10}$ at $x=$ maximum.

Parameter $n_{(x)}$ is responsible for the smooth connection of the curve $Z_{m(x,y)}$ to the curve $Z_{n(x,y)}$ at points $-y_1$ and $+y_1$. This condition is fulfilled if the first derivative of the function $Z_{m(x,y)}$ equals the first derivative of the function $Z_{n(x,y)}$ at points $+y_1$ or $-y_1$. Consequently, the value for $n_{(x)}$ is found by solving the following equation:

$$\frac{dZ_{m(x,y)}}{dy} = \frac{dZ_{n(x,y)}}{dy} \text{ for } y = \pm y_1 \quad (2)$$

The peripheral curve $Z_{n(x,y)}$ is defined by the following function:

$$Z_{n(x,y)} = Z_{no(x)} + R_{p(x)} - \sqrt{R_{p(x)}^2 - y^2} \quad (3)$$

This function defines a circle with its vertex located on curves defined by the parametric function $Z_{no(x)}$ (See FIG. 3c).

The parametric function $Z_{no(x)}$ is given by the following conic expression:

$$Z_{no(x)} = \frac{1}{BL}\left(\sqrt{R_L^2 + B_{L(x)}^2} - R_L\right) \quad (4)$$

Constants $B_L$ and $R_L$ are chosen so as to provide the desired width for the reading portion and to minimize the astigmatism in the area adjacent to the distance portion.

Parameter $R_{p(x)}$ represents a modified distance between the point $x_1y_1$ on the curve and the line parallel to the x axis and intersecting the center of the distance portion $C_d$ (See FIG. 3b). It is defined by the formula:

$$R_{p(x)} = R_{(x)}(1 - A_{(x)}) \quad (5)$$

where $R_{(x)}$ is the exact value of the above distance (FIG. 3b) and $A_{(x)}$ is a modifying factor which typically assumes the value of 0.2 at $x=$ maximum and is 0 at $x=$ minimum. This modifying component is needed to correct the distortion of horizontal and vertical lines in the temple side of the peripheral portion after rotation of the lens to accommodate for left or right eye, as will be explained further hereinafter.

By designing a lens in accordance with the parametric equations described above, it becomes possible to provide a lens in which astigmatism errors are eliminated in the lower part of the temporal peripheral zone while at the same time distortion of horizontal and vertical lines is substantially reduced. The design permits this to be done without it being necessary to aspherize the distance portion of the lens as is done in certain prior art designs. Also, it is not necessary to provide a concentration of very strong astigmatism in narrow zones as is the practice in other designs.

Figure 4:
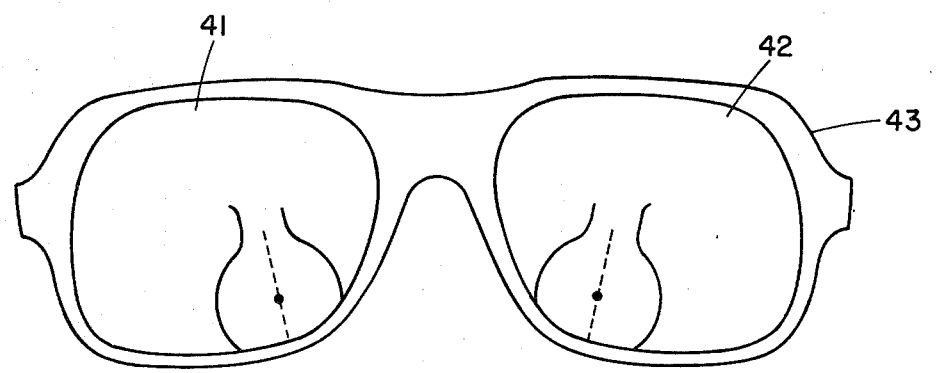
FIG. 4 schematically illustrates progressive lenses of the present invention inserted in a pair of eyeglass frames.

An especially important feature of the present invention is that the design allows distortion of horizontal and vertical lines to be corrected on the temple side of the peripheral zone after the lens has been rotated to accommodate the lens for the right or left eye. Specifically, FIG. 4 schematically illustrate progressive lenses 41 and 42 inserted in a pair of eyeglass frame fronts 43. As can be seen by the schematic representation of the progressive corridor and reading portions of the lenses, both lenses are tilted inwardly as this is necessary because of the convergence of the eyeballs when viewing near objects. Typically, these lenses are rotated 8°–10° from the vertical.

Figures 5A, 5B:
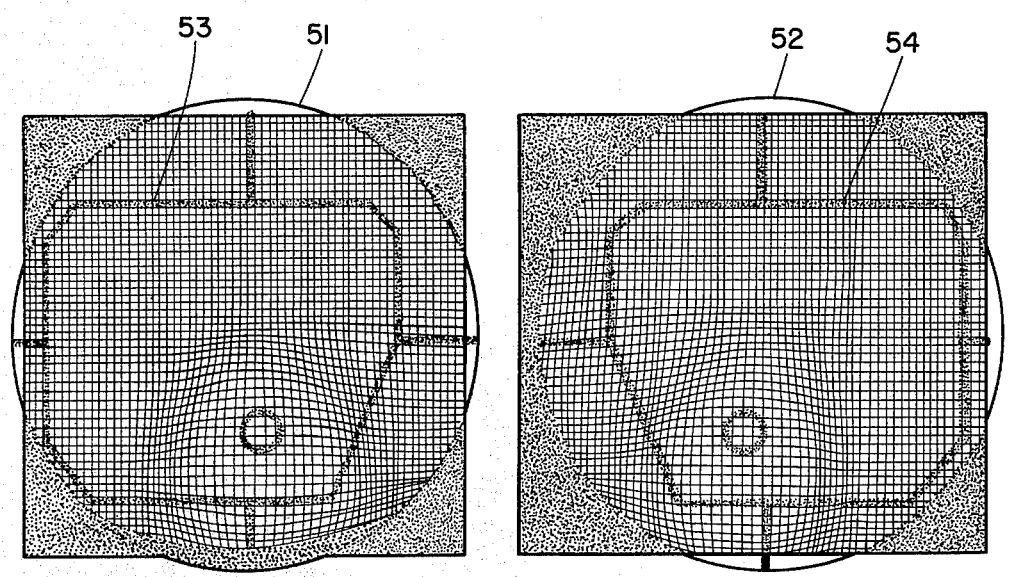
FIGS. 5a and 5b illustrate the lenses of FIG. 4 on top of a grid pattern to illustrate the improved optical properties of the progressive lens of the present invention.

In many prior art designs, although the lens may be corrected for distortion of horizontal and vertical lines in the peripheral zone for one central orientation, it loses the correction after being rotated. The present invention provides a unique geometry which allows the correction of distortion of horizontal and vertical lines to be retained below detectable levels at the temporal peripheral zone for both left and right rotation of the lens. This is illustrated in FIGS. 5a and 5b wherein a pair of lenses 51 and 52, rotated to accommodate the left and right eye, are positioned on a grid pattern. Specifically, the lenses have a zero distance power and a two diopter add power. These Figures clearly show that distortion of horizontal and vertical lines is not really detectable in temporal peripheral zones of the lenses.

As a matter of information, outlines 53 and 54 in FIGS. 5a and 5b indicate the outline of eyeglass frames indicating the shape of the lenses after being edged for insertion into frames.

The progressive lens according to the present invention can be manufactured from either glass or plastic as is well-known in the art. Preferably, however, it is a plastic lens made from CR-39, the polymer conventionally used in the manufacture of plastic ophthalmic lenses. Such a lens can be cast in a mold defined by two mold members separated from one another by an appropriate gasket. One of the mold members will be provided with a progressive surface on its concave surface so as to transfer that progressive surface to the convex surface of the plastic lens cast thereagainst.

The progressive mold surface can also be made in a variety of ways known in the art. Preferably, it is formed by sagging a circular piece of glass against a block of refractory material or metal that has been provided with a progressive surface by machining. The refractory block can, of course, be used many times to make molds while the mold members can also be used a number of times to cast lenses.

While what has been described above constitutes the presently most preferred embodiment of the invention, it should be understood that various changes and modifications are possible. Accordingly, it should be understood that the invention should be limited only insofar as required by the scope of the following claims.

We claim:

1. A progressively variable focal power lens, said lens having a progressive power surface comprising a distance portion, a reading portion, a progressive corridor and peripheral portions, whereby at least a portion of said surface can be defined in parametric form with reference to a three-dimensional coordinate system in which the origin of said coordinate system is at the vertex of the lens surface, the z axis is perpendicular to said surface at the vertex, the x axis is vertical relative to said surface, and the y axis is horizontal relative to said surface, wherein each cross-section of said portion parallel to the yz plane is defined as a two-dimensional curve having a central portion defined by the parametric function $Z_{m(x,y)}$ and peripheral portions defined by the function $Z_{n(x,y)}$, and wherein:

$$Z_{m(x,y)} = Z_{mo(x)} + \frac{1}{B_{(x)}}\left(\sqrt{\rho_{(x)}^2 + B_{(x)}y^2} - \rho_{(x)}\right) - \frac{1}{n_{(x)}}C_{(x)}y^{n(x)}$$

and $$Z_{n(x,y)} = Z_{no(x)} + R_{p(x)} - \sqrt{R_{p(x)}^2 - y^2}$$

where:

$Z_{mo(x)}$ is the function that describes the geometry of the umbilical line of the lens surface;

$B_{(x)}$ is the conic constant for the conic component of the function;

$\rho_{(x)}$ is the y,z component of local radius of curvature $R_{m(x)}$ of the umbilical line defined by the function $Z_{mo(x)}$;

$C_{(x)}$ is a very small parameter to suppress the contribution of the exponential component, $1/n_{(x)}C_{(x)}y^n(x)$, in the central portion of the curve;

$n_{(x)}$ is the parameter responsible for the smooth connection of the curve $Z_{m(x,y)}$ to the curve $Z_{n(x,y)}$, the value of $n_{(x)}$ being found by solving the equation $$\frac{dZ_{m(x,y)}}{dy} = \frac{dZ_{n(x,y)}}{dy}$$

for the values of y equal to the points of connection;

$$Z_{no(x)} = \frac{1}{B_L}\left(\sqrt{R_L^2 + B_{L(x)}^2} - R_L\right)$$

wherein:

$B_L$ and $R_L$ are chosen to provide the desired width for the reading portion of the lens surface, $R_{p(x)} = R_{(x)}(1 - A_{(x)})$ where $R_{(x)}$ equals the distance between a point $x_i y_i$ on the curve and the line parallel to the x axis and intersecting the center of curvature of the distance portion of the lens surface; and $A_{(x)}$ is a modifying factor for correcting the distortion in horizontal and vertical lines in the temple side of the peripheral portion after rotation of the lens to accommodate for left or right eye.

2. A lens as recited in claim 1 wherein the bottom half of said lens surface comprising the progressive corridor, the reading portion and the peripheral portions comprise the portion of said surface that is defined in said parametric form.

3. A lens as recited in claim 2 wherein said distance portion comprises substantially the top half of said lens surface and is of a spherical curvature.

4. A lens as recited in claim 1 wherein said progressive corridor is designed such that along the vertical length of the corridor, the curvature of a vertical element of the corridor is of a weaker dioptric power than the curvature of the corresponding horizontal cross-section at that element.

5. A lens as recited in claim 4 wherein the power difference between the curvature of a vertical element of the corridor and the curvature of its corresponding horizontal cross-section equals about 20% of the add power at the top of the corridor and gradually decreases to approach zero at the bottom of the corridor.

* * * * *